United States Patent Office 3,340,784
Patented Sept. 12, 1967

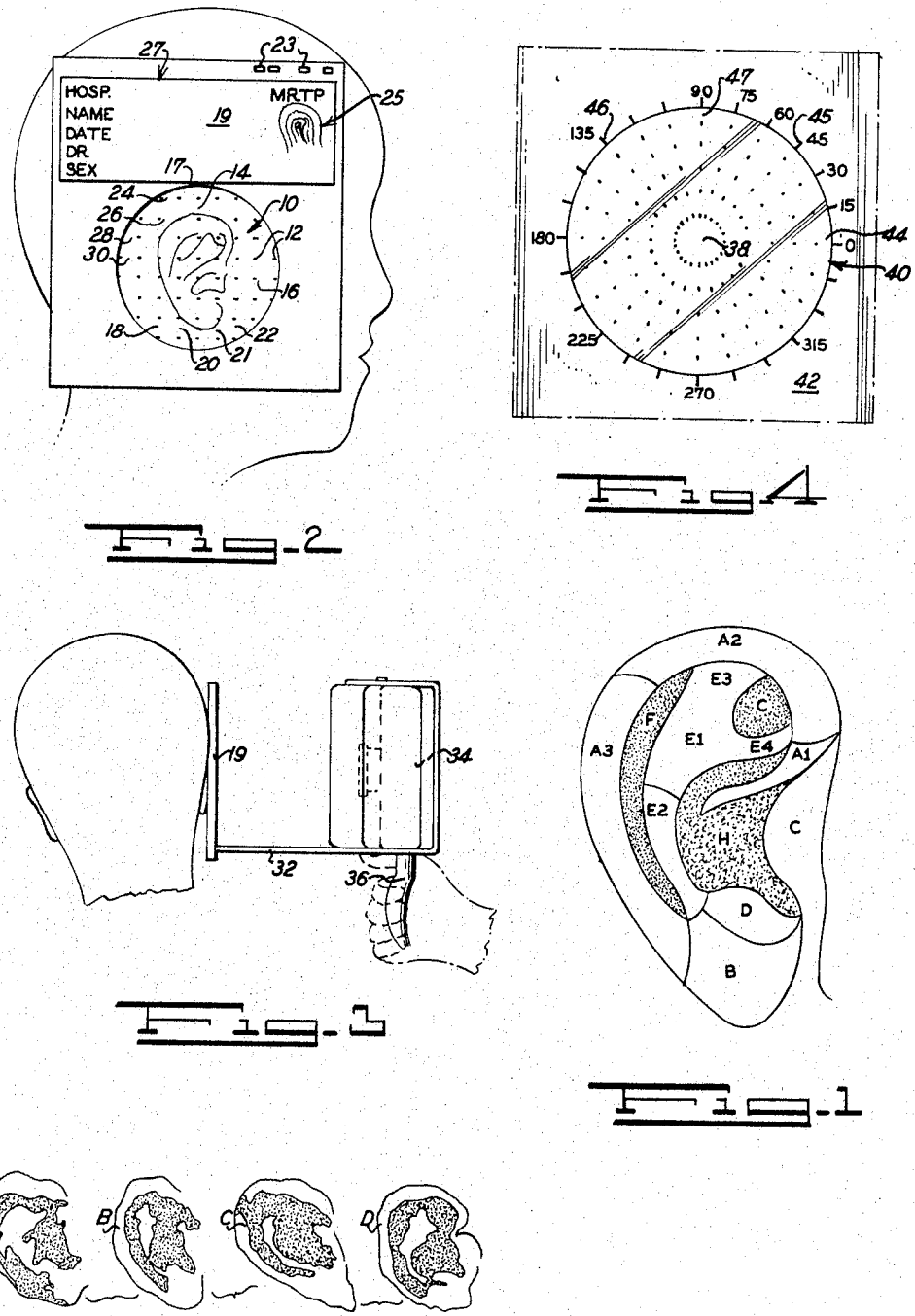

3,340,784
PHOTOGRAPHIC MEASURING DEVICE
Manuel Zimberoff, 2308 Lincoln Ave.,
Chicago, Ill. 60614
Filed Apr. 22, 1963, Ser. No. 275,793
2 Claims. (Cl. 95—1.1)

This invention is an improvement in the system for identifying humans photographically by making a photographic record of a human ear in conjunction with a measuring device for orienting, with respect to such device, various personal characteristics of the ear, as set forth in my parent co-pending application Ser. No. 628,922 filed Dec. 17, 1956, now Patent No. 3,102,459, of which the present application is a continuation-in-part; and particularly, to a further improved measuring device useful in the making of such records of identification.

As set forth in my parent application, this system, while useful in identification of humans of all ages, is particularly useful in identification of humans in extreme youth, such as newborn babies. Newborn infants are most difficult to permanently identify in permanent records, reliable for that individual's identification in subsequent years following the early formation of the record. In the past the identification has been by making of foot prints of the infant and sometimes finger prints. However, in the newborn baby, discounting the possible contamination of the infant in making such foot or finger prints in application of commercial inks or contact with record paper to which the print must be applied, as well as the difficulty of handling of squirming infants to mechanically produce such record, even when a perfect foot or finger print record of the newborn infant is unreliable for its identification. This is because the newborn infant does not have either in fingers or toes adequately developed whorls and ridges which will suffice for reliable identification. Thus, even where a perfect print of fingers or toes is taken, only about 25% reliable identifications are produced in finger or foot printing of infants.

Further description and discussion of the system is made in conjunction with the drawings herewith in which are illustrated, without intending to be limited in the practice of this invention to the exact illustrations, improved measuring devices useful in photographing of the ear wherein FIG. 1 is an enlarged ear delineated by markings into different areas having useful characterics for identification;

FIG. 2 illustrates my improved ear measuring device placed about an infant's ear for purposes of photographing the same;

FIG. 3 illustrates the camera and identifying device in position showing the method of photographing;

FIG. 4 is a slightly modified measuring device from that shown in FIG. 2; and

FIG. 5 A, B, C and D illustrate different general types of ears.

As indicated, the system of the present invention relies upon the morphology of the ear to make a permanent identification. The human ear, either in the shape and arrangement of the cartilagenous projections, auricular appendages, contour of the outer ear and lobes, or various other individual ear anomalies, serve as a much more reliable identification of the individual baby or identification of the adult. While various ear anomalies tend to run in families, yet there are identifiable differences in each individual.

More particularly, for that kind of identification the ear is subdivided as lettered in FIG. 1. For instance, the outer edge or rim of the ear, sometimes called a helix, begins at a narrow portion almost just above the auditory canal and curves outward to the edge, that first portion being lettered A1, the upper rounded rim portion is A2 and that continues into the rim portion comprising the back of the ear A3. The lower lobe or lobule portion is lettered B. The center portion adjacent the base is called the tragus or corner of the ear and is lettered C. The portion just above the lobe and forming the bottom of the shell is lettered D and is called the antitragus. Beginning from the antitragus is another opposite inner helical portion called the antihelix, lettered E1; and at its lower portion in back of the central opening or auditory canal of the ear is E2 called the lower part of the antihelix, which further divides into an upper branch E3 and a lower branch E4. The two helices A and E, bound between them a longitudinal furrow at the rear lettered F and an upper finger furrow G. Finally, a central portion, called the shell of the ear which leads into the auditory canal, is lettered H. This latter is sometimes called the concha or conch.

As thus described, it will be noted that there are numerous helical prominances, furrows of different shapes and contour which, as subdivided by letters, represent different areas of the ear. It is these different curves, prominences, etc., which serve as a basis for identifying the pecularities of the ear and which in combination comprise a group of ear anomalies which would not be dupliciated, but in fact serve to identify each individual. Most important, the human ear, while from earliest infancy up to the age of from 3 to 9, tends to grow in size, does not change in such individual characteristics. Thus, a permanent record of the individual ear serves reliably to identify the individual and such record may be taken from earliest infancy and relied on for identification in the later years since the ear does not change sufficiently to affect the reliability of such identification.

According to the present system, the permanent record may be made from earliest birth, photographically in conjunction with a measuring instrument having spaced indicia whereby the positioning of one or more of the several ear anomalies with respect to such measuring device, is made available as a permanent record of the ear photographed in conjunction therewith. That photograph serves to show the measured relative positions of the various ear anomalies as useful individual identifying characteristics. For this purpose the newborn infant has its ear photographed in conjunction with the measuring device as shown in FIG. 2 or FIG. 4 hereof.

The measuring device of FIG. 2 comprises a transparent plastic pane 10 having a series of horizontal and vertical rows of small opaque such as black dots 12 disposed thereon. These dots are so small that they will not, in themselves, obscure any significant area of the ear to be photographed through the transparent sheet upon which they are mounted. However, they are large enough to appear in the final photograph. They are disposed a preselected distance apart which may be varied, within the principles of this invention, from about ⅛ to ½ inch, preferably about 3/16 to 5/16 of an inch apart as shown, horizontally or vertically in either direction from dot to dot.

The sheet of transparent plastic film 10 having the regularly spaced dots 12 thereon, preferably has a vertical center line 14 through the dots appearing in that vertical center line for alignment of the plastic pane and dots therein along a vertical line 14. If desired, a horizontal axis line shown in dotted line position in the horizontal axis line 16 interconnecting the dots in that approximate horizontal row, may also be present. However, I prefer to omit such in the most practical form. These lines 14 and/or 16, when the latter is used, serve to align the dots along a vertical or horizontal graphical axis for photographic alignment purposes with the ear to be photographed.

It is preferred to mount the plastic pane 10 as a transparent window enclosing an annular open section 17 cut in a file card or other white usually paper board, card 19. The plastic film 10 may be attached to the card in any suitable way as by simple adhesion to the surrounding window portions of the opening 17 therein; or it may be inserted between plies of a laminated card, the laminations comprising a framework surrounding the transparent plastic portion securing the same thereto in photographically oriented position. While, as shown in FIGS. 2 and 4, that opening is preferably annular or circular, it could be rectangular or other desired shape. It is of a size sufficient to photographically expose an entire ear, small if the ear to be photographed is that of a baby, or larger for adults. The card 19 could have further markings about the periphery of the window which might serve the purpose of identifying vertical rows of dots, such as rows 18, 20, 21, 22, and the like, and indicia numbering or lettering the horizontal rows, such as 24, 26, 28, 30 and the like.

The card 19, serving as a support for the measuring dotted plastic pane window 10, also operates as a shield to blank out the rest of the child's face, thereby to concentrate the total photographed individual characteristics in the ear and its actual measurements. That card 19, moreover, serves to protect the infants during photography against contamination and, as a card, it does not need to be reused but could be disposed of. Normally the card would either have printed thereon useful identifying data, such as the name of the hospital, the name of the infant or its family, the date of birth, the name of the doctor, the sex of the infant and the fact that the picture is of the right (or left) ear. Generally, while this data could be printed upon the card itself, it is sometimes preferred to print the data on an extra label 27 which is then adhered to the portion of the card as shown. The card could, either on the label or on the card itself, have suitable indexing data, such as perforations 23 or markings which would indicate perforation locations for transfer by photography to the photograph, which in turn could be so perforated according to the markings 23. Such perforations as known for filing systems are useful in the further filing of the photograph. Moreover, for further identification, it is often useful to apply the thumb print 25 of the mother to that card as shown. As indicated above, while numbers could be placed upon the different rows of dots, such is not usually necessary for measurement afforded by the pattern of dots for the various ear anomalies.

Referring to FIG. 1, each of the sections A–H can be indicated upon the card 19 before photographing both as to size and the orientation, by indicating the number of dots, measuring distances between points or individual dots serving to orient peculiarities of the different specific parts of the ear. For instance, the total length or width of the ear is measurable merely in terms of the number of dots. Referring to FIG. 5 A, B, C and D, it will be noted that some ears are rectangular FIG. 5A, oval FIG. 5B, triangular FIG. 5C, etc., in general contour, and these may be set at an angle with respect to the vertical. The vertical line 14 of the transparent plastic sheet serving to orient the card with respect to the ear may always be oriented vertically during photography, whereby any angular cast of the ear with respect to that vertical line can be measured in terms of degrees.

For purposes of actual measurement, the card is mounted in a small bracket (not shown) for support at the end of a plate 32, as shown in FIG. 3, and a camera 34 is mounted at an opposite end of the plate 32 so that the photographic assembly held by a handle 36 with the card oriented against the childs ear is thereby supported in properly focused position for photography as will be obvious from the illustration in FIG. 3.

In an alternate device for measuring the ear, as shown in FIG. 4, the dots may be distributed from an origin or center point 38 of a plastic sheet 40 comprising the transparent plastic window of a card 42. In this modification, the dots particularly, are disposed in concentric circles along radii measuring regular angles of the circles. For example, a dot is disposed every 15 degrees more or less, each circle of dots being disposed in about from 1/8 to 1/2 inch increments of radius from the center, preferably each increasing from about 3/16 to 5/16 inch in radius for each circle of dots, whereby each dot then becomes oriented by the magnitude of the circle from the center, first, second, third and fourth, etc., and by the angle of the radius comprising the line of dots beginning with line 44 at zero or 180°. While, of course, the exact angular degree of each radius of dots may be marked upon the card as 15, 30, 45, 60, 75, 90, etc., that is not usually necessary, because the angular position of the dots with respect to the origin 44 is readily estimated and such indicia may be present or omitted from the marginal portion of the card surrounding the window, as desired. Again, while the dots occur of greater frequency, it is possible at certain key angles to have angular radii marked upon the plastic, such as the radius 44 at zero degrees, the radius 45 at 45 degrees, or the radius 46 at 135 degrees, etc. For purposes hereof, however, the only actual linear marking preferred is the vertical radius 47 as in FIG. 2 and sometimes the horizontal radius 44, for accurate alignment of the center with respect to the ear.

Of course, it will be appreciated that in use of a measuring device, as shown in FIG. 4, the actual distances can be measured in angles as well as the magnitude of the radii of the circles upon which the dot lies from the center, rather than merely the distance between two dots or the identification of a dot in a horizontal or vertical row, as would be the case in FIG. 2. The card having a plastic window as shown in FIG. 4 may also have the identifying data either printed on the card or on a label attached thereto as described for FIG. 2. However, it will be appreciated that while it is quite convenient and of greater safety for further future identification, and to avoid confusion, to have such data placed initially upon the card before photographing the ear of the baby, yet, that data could, of course, be applied after the photograph has been taken, with however, somewhat less security in the accuracy thereof.

In operation of the system, the baby has its right or left ear photographed very shortly after birth in a manner illustrated in FIG. 3, using the photographic card as shown in either FIG. 2 or 4. That card has the data 27 marked thereon before photographing. However, the photograph itself may be studied and any peculiarities in the photograph may be noted on a proper data portion indicating such, and if desired, perforations for purposes of filing according to the peculiarities of that ear, may be marked on the photograph, whereby it may be filed and found by that filing system under reference to the peculiarities of the ear.

It may be desired to again photograph the child in a similar manner with such a measuring device after substantial growth of the ear has taken place, and which will, in comparison with the first photograph taken, show the same relative positions of the identifying characteristics of the ear, but in somewhat enlarged size resulting from the growth.

During the photographing, as mentioned, the first picture may be taken directly in plan and other views may be taken at oblique angles for three dimensional comparison of permanent identifying characteristics, if desired.

As thus described, a new system for identifying humans from earliest infancy is provided with outstanding advantages in reliability to adequately identify the human and particularly to identify infants, which identification upon infants has not heretofore been practically reliable or conveniently made. The system may be operated in the nursery under completely antiseptic or therapeutic conditions without danger of contamination of a sterile nursery and baby. Moreover, it may be applied by hospital personnel using sterile photographic equipment, for instance, such as shown in U.S. Patent 2,697,392. Particularly improved photographic measuring devices are described which allow accurate identification of the peculiarities of an ear as well as their orientation to identify such peculiarities in specific regions of the ear.

Certain modifications of this invention will occur to those skilled in the art and it is accordingly intended that the drawings and description herein given be regarded as illustrative and not limiting, except defined in the claims.

I claim:

1. The combination of a photographically-sensitive sheet and a measuring device comprising a transparent plastic film, said film having regularly spaced indicia evenly distributed in a pattern throughout the surface thereof in straight parallel rows both vertically and horizontally as a linear measuring device of the ear, said combined photographic sheet and film being sized substantially only to expose and print an individual human ear on said photographic paper in conjunction with said plastic film, whereby the individual characteristics of said photographed ear are linearly identifiable in conjunction with the linear markings printed from said film.

2. The combination of a photographically-sensitive sheet and a measuring device comprising a transparent plastic film, said film having regularly spaced indicia arranged radially through the center thereof subtending equal angles, said indicia comprising a linear measuring device for characteristics of the ear, said combined photographic sheet and film being sized substantially only to expose and print an individual human ear on said photographic paper in conjunction with said plastic film whereby the individual characteristics of said photographed ear are linearly identifiable in conjunction with the linear markings printed from said film.

References Cited

UNITED STATES PATENTS

| | | | |
|---|---|---|---|
| 574,605 | 1/1897 | Hailes | 33—64 |
| 1,415,833 | 5/1922 | Ginsburg | 33—64 |
| 1,937,831 | 12/1933 | McCollum | 33—1 |
| 2,314,642 | 3/1943 | Worcester. | |
| 2,344,823 | 3/1944 | Landis et al. | |
| 2,770,044 | 11/1956 | Wood | 33—121 |
| 2,796,666 | 6/1957 | Liebowitz | 33—64 |

LEONARD FORMAN, *Primary Examiner.*

ISAAC LISANN, *Examiner.*

WILLIAM D. MARTIN, *Assistant Examiner.*